United States Patent

[11] 3,555,318

| [72] | Inventor | Ubaldo Ranzi<br>Via Roma 2, Legnano, Italy |
|---|---|---|
| [21] | Appl. No. | 859,526 |
| [22] | Filed | July 8, 1969 |
| [45] | Patented | Jan. 12, 1971<br>Continuation of application Ser. No.<br>467,844, June 29, 1965, now abandoned. |

[54] ELECTRIC MOTOR HAVING A STARTING FRICTION COUPLING
2 Claims, 10 Drawing Figs.

[52] U.S. Cl........................................................... 310/78, 192/21.5
[51] Int. Cl....................................................... H02k 7/108
[50] Field of Search........................................... 310/78, 112, 114, 119, 120, 101; 192/21.5

[56] References Cited
UNITED STATES PATENTS

| 2,430,634 | 11/1947 | Glanz, Jr. ..................... | 310/78 |
| 2,785,325 | 3/1957 | Keyner........................ | 310/78 |
| 2,895,579 | 7/1959 | Terry........................... | 192/21.5X |

*Primary Examiner*—D. F. Duggan
*Attorney*—Stowell & Stowell

ABSTRACT: A combination electric motor and friction coupling wherein the motor comprises at least a motor rotor, a motor stator and a motor housing and the friction coupling comprises at least a coupling housing, a coupling rotor and torque transmitting material between the coupling rotor and the coupling housing, and wherein one element of the friction coupling is integral with the motor rotor and the other element of the coupling is connected to the means to be driven.

INVENTOR.
UBALDO RANZI

BY Stowell & Stowell

ATTORNEYS

ELECTRIC MOTOR HAVING A STARTING FRICTION COUPLING

This application is a continuation of application Ser. No. 467,844, filed Jun. 29, 1965, now abandoned.

Various friction couplings are known among which there are a few covered by patents in the name of the applicant of this invention. The purposes of their use in the electric motor field are also known, especially in combination with short circuit asynchronous motors used to actuate driven means or for various purposes.

Concerning the couplings in question, called "starting couplings," it is to be remembered that their main purpose consists in their permitting the driving shaft to reach a number of revolutions that is different from the number of revolutions of the driven shaft without affecting the amount of the torque transmitted from the former to the latter.

The difference between the respective speeds called "slippage" is generally positive (number of revolutions of the driving shaft minus the number of revolutions of the driven shaft) except, of course, for certain short periods of time during reversal of direction of rotation of the driven means.

The slippage can, as in the case of hydraulic couplings, be permanent or limited only to the starting period, as in the case of joints that are controlled by centrifugal force.

Concerning the purpose of using couplings, particularly in combination with asynchronous short circuit motors, it should be noted that such purposes are obviously those for which the various couplings, having the above mentioned fundamental feature were conceived.

The purposes are:

a. To permit starting a given driven means having a resistant torque greater than that which the inoperative asynchronous motor is capable of furnishing at the instant of insertion of the current (static torque).

b. To reduce to a minimum (a fraction of a second) the duration of the action of the very high current which always occurs both in the rotor cage and in the stator winding with zero or a very low number of revolutions. This result is of particularly practical importance when the driven means is heavy and has substantial inertia.

c. To perform gradual starting of those driven means for which accelerations, when too abrupt, could cause drawbacks of various kinds (structural, technological and so on).

While the combination of electric motors and slipping couplings, generally called "starting couplings" as mentioned above are known, nevertheless the present invention solves the problem inherent in the difficulty presented by said combination when the electric motor on one hand, or the coupling on the other, are separate or independent mechanical means.

Another problem which is not easily solved without this invention arises when using a multipolar asynchronous motor (for instance a 4-pole or 8-pole motor). In this case it is necessary, when the coupling is structurally separate from the motor, to employ two couplings of different sizes in series or provided with mechanical clutching means to connect or disconnect the smaller coupling to or from the driven shaft. It is clear that when the power to be transmitted is high, an assembly of separate couplings overhanging the end of the driving shaft has a substantial weight and inertia that obstructs not only the static sizing of the shaft and the bearings, but also the dynamic balancing of the assembly, which are drawbacks that this invention eliminates.

The electric motor friction coupling combination, according to this invention, which includes a coupling casing (with hereinafter will be called "primary element" ), a coupling rotor (called "secondary element" ) and a torque transmitting means interposed between the casing and the rotor, is characterized in that at least a part of the coupling casing and/or the coupling rotor constitute an integral part of the resistant structure of the electric motor assembly.

This principle in practice can be developed according to various embodiments of the motor coupling combination depending upon the characteristics and the requirements of its use. For example, the motor coupling combination can comprise two or more couplings, the rotors of which are connected either to a single shaft or to separate shafts, and said couplings could be arranged on one side of the rotor of the electric motor, or on both sides thereof.

The shaft of the motor coupling, constituting a power output shaft could pass through the rotor of the motor, In addition, the electric motor could be formed by two elemental motors having different characteristics, for instance, having a different number of poles to develop different r.p.m.s. and the shafts of said motors could be kinematically connected to one or two power output shafts while a tachometer unit could control switching on one or the other of said two motors.

The invention will now be disclosed in the following description by making reference to the accompanying drawings, which illustrate by way of example some practical forms of the motor coupling combination.

Figure 1:
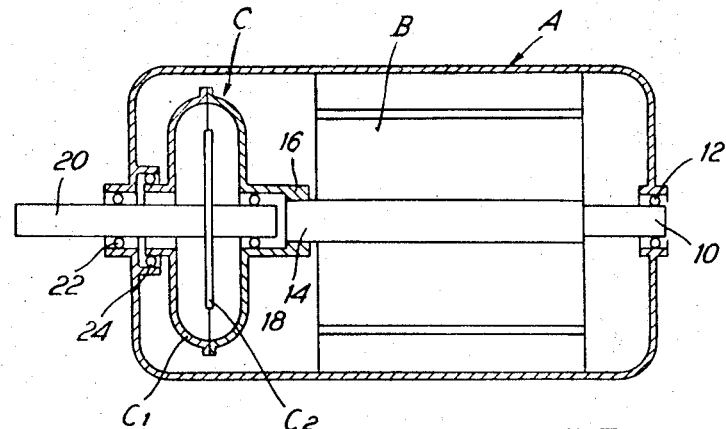
FIG. 1 is a diagrammatically longitudinal cross section of the structure of the motor coupling assembly.

Turning to FIG. 1, the motor as illustrated comprises a stator structure A which carries rotor B and coupling C laterally arranged relative to said motor. Coupling C comprises a housing $C_1$ in which rotor $C_2$ and a torque transmitter consisting, for instance, of granular or powder material are arranged. According to this invention the rotor is connected in a known way to a shaft 10 with one of its ends being supported by a bearing 12, held by the stator structure A, while the other end 14 laterally projects from said rotor B and a bushing 16 integral with casing $C_1$ of the coupling is fitted thereon. A bearing 18 is carried by the bushing and retains one of the ends of a shaft 20, to which rotor $C_2$ of the coupling is keyed, and the other end of the shaft 20 is carried by a bearing 22 held by the stator A.

With this arrangement, shafts 10 and 20 are coaxial and the latter of said two shafts which projects from the stator structure A constitutes the power output shaft for the driven means. Casing $C_1$ of the joint is supported at its other end by stator structure A through bearing 24.

The foregoing motor coupling assembly comprises a structure which withstands not only the conventional torsional stresses, but also bending stresses which can occur in the case where a connection between shaft 20 and the driven means includes an indirect coupling through gears or the like.

Figure 2:
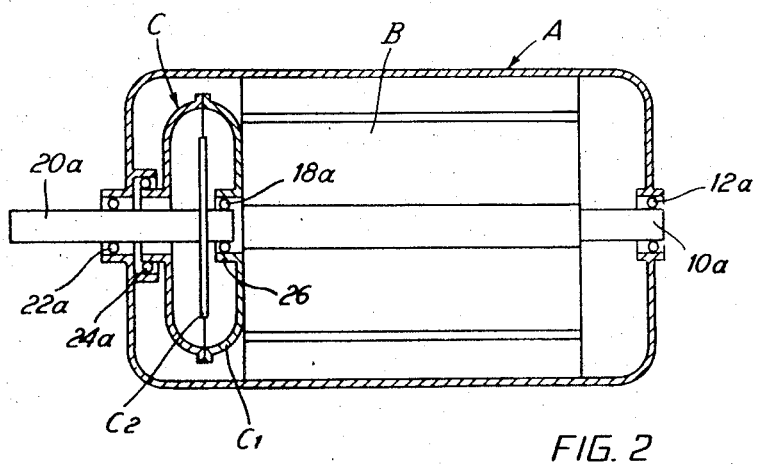
FIGS. 2 to 4 are similar cross sections of three variations of the structures shown in FIG. 1.

The motor illustrated in FIG. 2 has a structure like that of the motor shown in FIG. 1 and the various parts are designated by the same references followed by the letter designation (A). Casing $C_1$ of coupling C (more precisely, one of the two casing halves) is made integral with the side of the rotor B and comprises a hub 26 to retain bearing 18a which supports shaft 20a together with bearing 22a.

Figure 3:
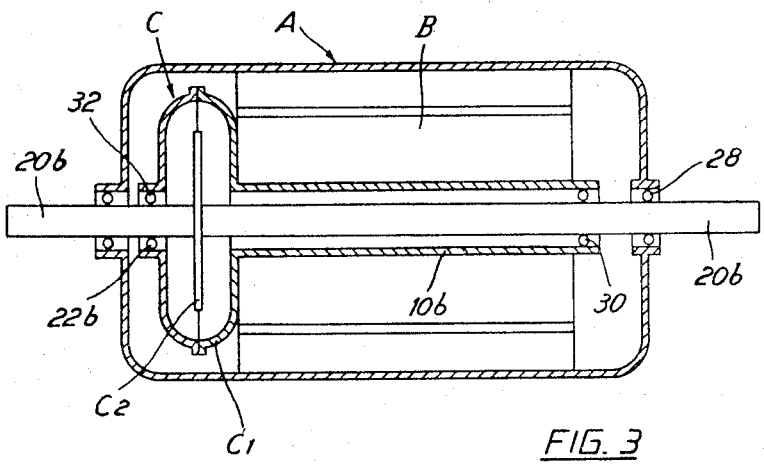

FIG. 3 shows the resistant structure of a motor coupling wherein casing $C_1$ of joint C is coupled to a tubular shaft 10b to which the electric rotor B of the motor is keyed. In this embodiment, shaft 20b is coaxial to the interior of the tubular shaft 10b and is carried by the stator structure A of the motor, by means of the end bearings 22b and 28.

The assembly formed by the electric rotor B and casing $C_1$ is in turn supported by shaft 20b by bearings 30 and 32 which are interposed respectively between tubular shaft 10b on one side and casing $C_1$ on the other.

This embodiment, from the construction point of view, is very balanced and can be used advantageously to transmit average and high power. The indirect coupling of the motor under consideration does not detract in any way from the motor per se.

Figure 4:
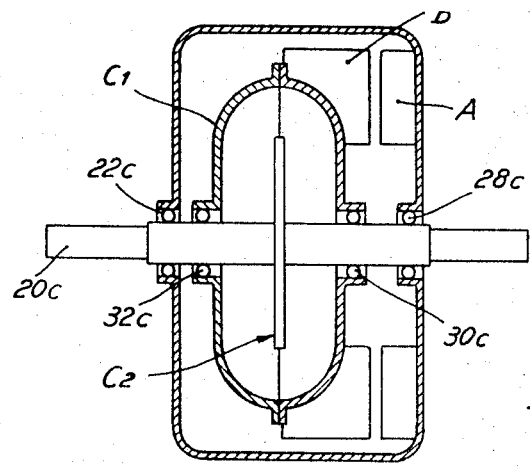

The modification of FIG. 4 shows the resistant structure according to this invention, intended for an electric motor with a rotor B arranged in front of stator A and which is statically similar to the motor of FIG. 3.

Casing $C_1$ of the coupling is partially incorporated in the structure of the electric rotor B to form a single element carried by means of bearings 30c and 32c, which projects from both the sides of the stator structure A of the motor in like manner as the motor of FIG. 3.

Figure 5:
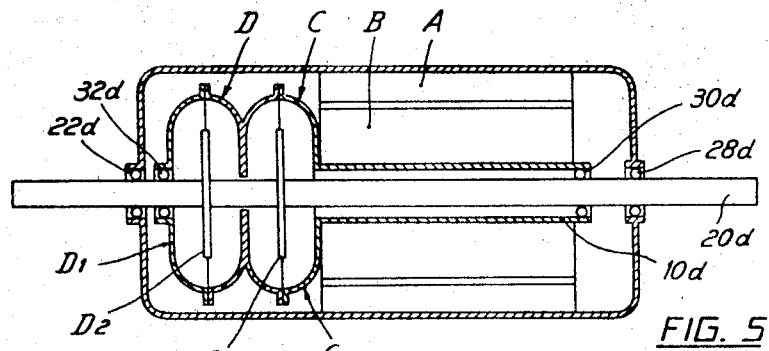
FIGS. 5 and 6 show an axial cross section two other variations wherein the motor is combined with the coupling.

Turning now to the motor illustrated in FIG. 5, said motor has a structure equivalent to that of FIG. 3, that is electric motor rotor B is keyed on a tubular shaft 10d.

According to this modification, a casing C1 of a first coupling C is connected to casing D1 of a second coupling D. Casing C1 is also connected to one end of shaft 10d to thereby constitute an assembly of two couplings in parallel. Rotors C2 and D2 of these two couplings are both keyed to shaft 20d which constitutes the power output shaft and which supports by means of the bearings 30d and 32d the electric rotor B and casings $C_1$, $D_1$.

In the modification of FIG. 5, since casings C1 and D1 of the structure have a greater area and volume than those of a single coupling of equal power rating, it is possible to obtain a greater thermic accumulator efficiency. It is thus possible to obtain faster and more efficient cooling of the coupling, or such coupling would be subjected, with equal work developed, to less heating. This type of motor coupling is advantageously adapted to start machines having a high inertial moment and very frequent startings.

Figure 6:
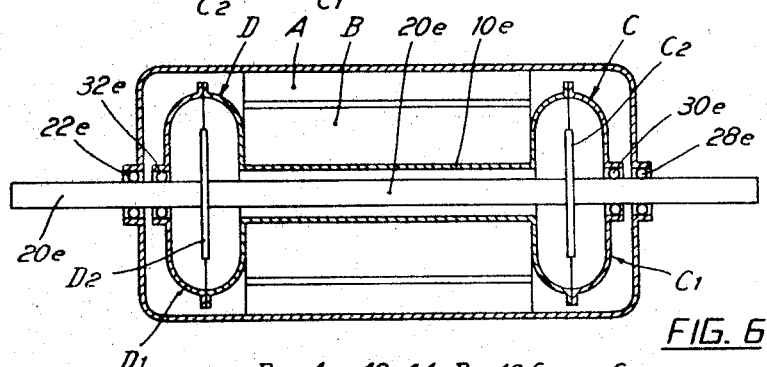

FIG. 6 illustrates a coupling motor combination having structures similar to that of FIG. 5, where the two couplings C and D, though operating in parallel, are however separated from each other and arranged at each of the ends of the electric rotor B. In this case the structure of the motor coupling is symmetrical and shaft 20e is provided at its ends with two power outputs and supports by means of bearings 30e and 32e, electric rotor B, and casings C1 and D1 of the couplings.

Figure 7:
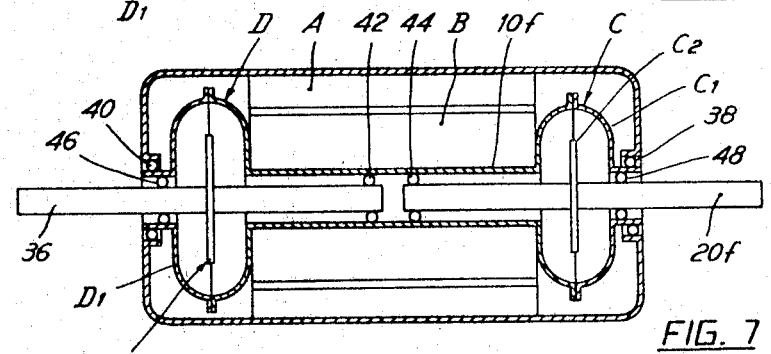
FIG. 7 is a diagrammatic axial cross section of a motor with two couplings having different sizes and independent shafts.

The motor coupling combination shown in FIG. 7 has a structure statically similar to that of FIGS. 1 and 2; but the two couplings C and D, located at the ends of the electric rotor B, have different sizes and the rotors C2 and D2 of the couplings are keyed on respective shafts 20f and 36 which are coaxial to each other.

Electric rotor B casings C1 and D1 assembly of the coupling is supported by the stator structure A of the motor by means of the bearings 38 and 40 interposed between these parts. Further shafts 20f and 36 are retained in the interior of tubular shaft 10f by bearings 42 and 44, and other bearings 46 and 48 carried by the casings D1 and C1 complete the retaining of said shafts. It derives from this a static structure which, as to the bending moments, is equivalent to the structures of FIGS. 1 and 2.

This motor coupling combination supplies two different torques at the ends of the two power output shafts 20f and 36. The availability of two different torques is useful when startings are required with acceleration torques. For instance through the coupling C a torque equal to the rated torque of the electric motor can be obtained, while through coupling D a multiple torque, e.g. a torque twice the rated torque of the motor is obtained.

Figure 9:
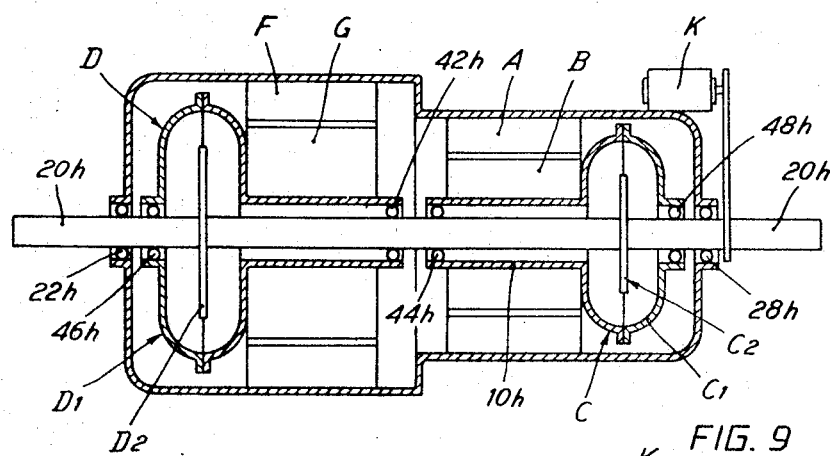
FIGS. 8 to 10 show in an axial cross section, three bi-pole motor and coupling combinations.
Figure 10:
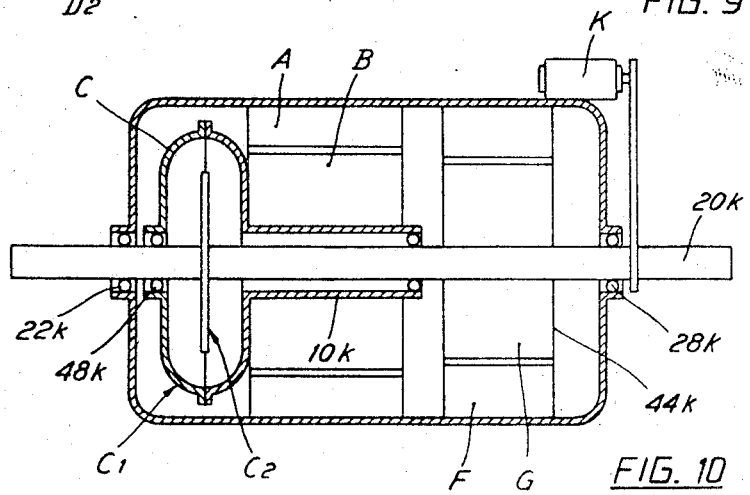
Figure 8:
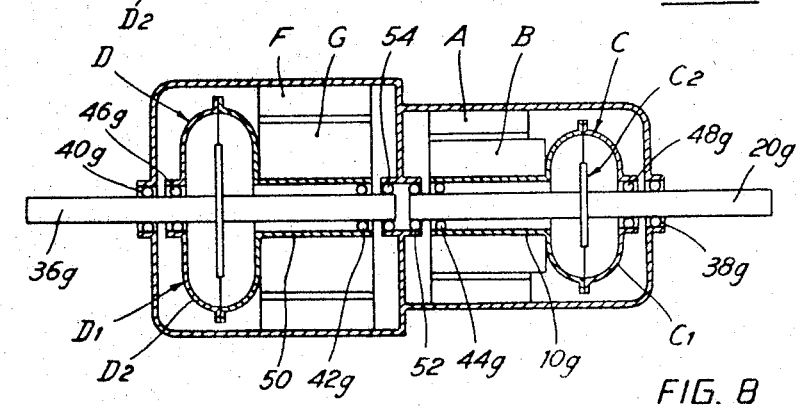

In FIGS. 8 to 10 three embodiments are illustrated, each relating to an electric multipoled motor consisting of two elemental rotors A–B and F–G, each having different electrical characteristics such as a different number of poles to thereby have two different speeds. The motor coupling assembly of FIG. 8 is constituted, from the mechanical point of view, by a single stator structure A–F and two electric rotors B and G keyed on respective tubular shafts 10g and 50 which retain at their opposite ends two casings C1 and D1 of two different couplings C and D. These two groups B–C1 and C–D1 are supported through bearings 42g—46g and 44g—48g by two shafts 20g and 36g which are coaxial and mechanically independent to form two distinct power output shafts. Rotors C2 and D2 of said two couplings are keyed on said shafts. Shafts 20g and 36g are in turn carried by the stator structure A–F through the intermediary of bearings 38g–52 and 40g–54.

The motor coupling combination thus formed has two different speeds to operate two machines or a single machine with two different speeds. The system can also be used in a speed differential system.

The motor coupling combination shown in FIG. 9 comprises a resistant stator structure A–F and two rotor groups B–C1 and C–D1, but in this modification said two groups are supported, through bearings 42h—46h and 44h—48h, by a single shaft 20h carried by the resistant stator structure through bearings 22h and 28h.

A tachometer device K is included in the motor coupling now considered and can be constituted, in a known way, by an electric generator actuated by shaft 20h.

In this case, the motor coupling combination has further advantages, in addition to those already considered, for example said motor coupling can permit the simultaneous operation of the two motors A–B and F–G at the starting stage of the operative machine considered. During such starting a different slippage or shift of couplings C and D occurs and the couplings transmit their torques (which are summed) to shaft 20h; this permits the obtainment of a high static torque. When shaft 20h has reached a given speed, established by the requirements of use, tachometric dynamo K is put into operation and with the intermediary of known apparatus, shuts off the supply to one of the two electric motors, so that the operative machine, after the starting, is operated by only one of the motors of the motor coupling assembly of FIG. 9.

The motor coupling of FIG. 10 is substantially similar to that of FIG. 9 except that only one of the two electric motors (that is the motor A–B having the highest speed) is provided with a coupling C. Electric rotor G of the slow motor F–G is directly keyed on shaft 20 K.

In this motor coupling assembly, the startings are always carried out by the faster motor A–B and when shaft 20k reaches the synchronism speed relative to the slower motor F–G, the tachometric dynamo K functions to shut off the supply to motor A–B and the operative machine is operated by motor F–G. When the operative machine must be operated with a speed equal to that of faster motor A–B, motor F–G is shut off from the electric supply line and motor A–B through the coupling C starts and brings the operative machine to the normal running speed.

Other variations of the motor coupling assembly according to the invention could be conceived, taking into account the requirements of use, without departing from the scope of the present invention. In a similar way, modifications and variations intended to meet with the structural and resistant requirements of the motor coupling assembly could be made.

I claim:

1. An electric drive mechanism comprising an electric motor including a motor stator, a motor stator housing encasing the motor stator and to which the motor stator is secured, a motor rotor rotatably disposed within the motor stator housing and mounted adjacent said motor stator, a driven output shaft, a friction coupling connecting the motor rotor to the driven shaft, said friction coupling comprising at least one coupling housing rotatably mounted within the motor stator housing, a coupling disc rotatably mounted within the coupling housing and carrying a driven shaft extending out of the coupling housing, torque transmitting granular material disposed within the coupling housing and operative to couple the coupling disc and the coupling housing, the coupling housing being rigidly connected to the motor rotor to form a rigid rotor assembly having ends, and bearing means rotatably supporting said ends in the motor stator housing, a friction coupling housing rigidly connected to each end of the rotor, each coupling carrying its own driven shaft.

2. An electric drive mechanism comprising an electric motor including a motor stator, a motor stator housing encasing the motor stator and to which the motor stator is secured, a motor rotor rotatably disposed within the motor stator housing and mounted adjacent said motor stator, a driven output shaft, a friction coupling connecting the motor rotor to the driven shaft, said friction coupling comprising at least one coupling housing rotatably mounted within the motor stator housing, a coupling disc rotatably mounted within the coupling housing and carrying a driven shaft extending out of the coupling housing, torque transmitting granular material disposed within the coupling housing and operative to couple the coupling disc and the coupling housing, the coupling housing being rigidly connected to the motor rotor to form a rigid rotor assembly having ends, and bearing means rotatably supporting said ends in the motor stator housing, said driven shaft extending in both axial directions out of said friction coupling housing, said rotor being axially hollow to thereby accommodate one end of said driven shaft, a second friction coupling housing coupled to the rotor, the disc within said second friction coupling joined to said driven shaft.